US012722274B1

(12) United States Patent
Cares

(10) Patent No.: US 12,722,274 B1
(45) Date of Patent: Sep. 1, 2026

(54) DRILL GUIDE AND METHOD FOR USING THE SAME

(71) Applicant: Paul Cares, Saugatuck, MI (US)

(72) Inventor: Paul Cares, Saugatuck, MI (US)

( * ) Notice: Subject to any disclaimer, the term of this patent is extended or adjusted under 35 U.S.C. 154(b) by 0 days.

(21) Appl. No.: 19/068,282

(22) Filed: Mar. 3, 2025

(51) Int. Cl.
*B25H 1/00* (2006.01)
*B23B 45/00* (2006.01)

(52) U.S. Cl.
CPC ......... *B25H 1/0057* (2013.01); *B23B 45/003* (2013.01); *Y10T 408/5627* (2015.01)

(58) Field of Classification Search
CPC .. B25H 1/0057; B25H 1/0078; B23B 45/003; Y10T 408/5627
See application file for complete search history.

(56) References Cited

U.S. PATENT DOCUMENTS 1,118,268 A * 11/1914 Coates ................. B25H 1/0057 408/100
1,249,045 A * 12/1917 Diffendall ............ B25H 1/0057 408/99
1,352,646 A * 9/1920 Baltzley ............... B25H 1/0057 408/95
2,261,746 A * 11/1941 Seaboly ............... B25H 1/0057 408/712
3,250,153 A * 5/1966 Purkey ................. B25H 1/0057 408/100
3,282,132 A 11/1966 Neuschotz
3,538,794 A * 11/1970 Grundmeyer ........ B25H 1/0057 408/92
3,661,469 A 5/1972 Leff et al.
3,906,640 A 9/1975 Sosa
4,072,440 A 2/1978 Glover
4,540,319 A * 9/1985 Michiharu ........... B25H 1/0057 408/100
4,952,101 A 8/1990 Coombs
5,312,409 A 5/1994 McLaughlin et al.
6,375,395 B1 4/2002 Heintzman
7,503,732 B2 * 3/2009 Byrd .................... B25H 1/0078 408/16
9,554,812 B2 1/2017 Inkpen et al.
(Continued)

FOREIGN PATENT DOCUMENTS

EP 1201374 A1 * 5/2002 ........... B25H 1/0057

*Primary Examiner* — Eric A. Gates
(74) *Attorney, Agent, or Firm* — King & Partners, PLC

(57) ABSTRACT

A portable drill guide apparatus and method enabling precise alignment of both entry and exit points when drilling through workpieces. The apparatus comprises U-shaped mounting brackets, polymer mounting blocks that attach to a portable power drill, and a clamping mechanism with alignment pointer. The invention reverses conventional drilling approaches by first establishing the desired exit point location before determining the entry point, ensuring perfect alignment throughout the drilling operation. Particularly valuable for applications involving cylindrical objects, irregular forms, or scenarios where visualization of both sides of the workpiece simultaneously is impractical, the invention provides bidirectional alignment control for through-hole drilling operations in marine construction, timber framing, utility pole modifications, furniture making, and similar applications where traditional drill presses cannot be practically employed.

3 Claims, 9 Drawing Sheets

(56) References Cited

U.S. PATENT DOCUMENTS

| | | | | |
|---|---|---|---|---|
| 9,862,066 | B1 * | 1/2018 | Batt | B25H 1/0057 |
| 10,682,750 | B2 | 6/2020 | Zhong et al. | |
| 10,882,143 | B2 | 1/2021 | Kumkar et al. | |
| 11,065,694 | B2 | 7/2021 | Hartnagel et al. | |
| 11,537,099 | B2 | 12/2022 | Rivers et al. | |
| 11,945,036 | B2 | 4/2024 | Halvorsen et al. | |
| 2004/0062618 | A1 | 4/2004 | Trettin et al. | |
| 2004/0202516 | A1 * | 10/2004 | Lanser | B25H 1/0057<br>408/1 R |
| 2007/0276400 | A1 | 11/2007 | Moore et al. | |
| 2009/0162158 | A1 * | 6/2009 | Glodowski | B25H 1/0057<br>408/136 |

* cited by examiner

DRILL GUIDE AND METHOD FOR USING THE SAME

COPYRIGHT NOTICE

This application includes material that is subject to copyright protection. The copyright owner has no objection to the facsimile reproduction by anyone of the patent disclosure, as it appears in the United States Patent and Trademark Office files or records, but otherwise reserves all copyright rights whatsoever.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to drilling apparatuses, and more particularly to a portable drill guide system that enables precise alignment of both entry and exit points when drilling through workpieces, especially cylindrical or irregular objects.

2. Background of the Invention

Drilling through substantial objects, particularly cylindrical structures such as marine pilings, construction posts, utility poles, and large-dimension lumber, presents significant alignment challenges. Conventional drilling approaches typically focus on controlling the entry point of a drill bit, but provide limited or no control over the exit trajectory.

Traditional solutions include stationary drill presses, which excel at maintaining perpendicularity to a reference surface but cannot inherently establish or control exit points. This limitation becomes particularly problematic when drilling through curved surfaces, irregular objects, or when the exit point location is critical for subsequent assembly operations.

Various portable drill guides exist in the prior art, but these predominantly address entry-point alignment only, leaving the exit point to chance based on how accurately the operator maintains the intended trajectory. For applications requiring precise through-holes, this approach frequently results in misalignment, wasted materials, and compromised structural integrity.

In marine construction, utility pole modifications, timber framing, and similar applications, maintaining precise alignment between entry and exit points is essential for proper hardware installation, cable/conduit routing, and structural integrity. The inability to precisely control both aspects of through-hole drilling represents a significant technological gap.

Accordingly, there exists a need for a portable drilling guidance system that enables operators to establish both entry and exit points before commencing drilling operations, particularly for applications involving substantial or irregularly shaped workpieces where conventional drill presses are impractical.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention addresses the aforementioned limitations by providing a portable drill guide system that enables bidirectional alignment control when creating through-holes in workpieces of various configurations.

In one aspect, the invention provides a drill guide apparatus comprising a pair of U-shaped mounting brackets that establish a precise drilling trajectory, polymer mounting blocks that secure the system to a portable drill, a non-rotating rod that maintains fixed rotational alignment, and a clamping mechanism with alignment pointer that allows the operator to first establish the desired exit point before positioning the drill at the entry point.

In another aspect, the invention provides a method for creating precisely aligned through-holes by first establishing the exit point position, securing the guide system to the workpiece, and then positioning the drill to create an entry point that ensures proper trajectory through to the predetermined exit location.

Unlike conventional drill guides that control only the entry orientation, the present invention creates a complete spatial reference system that ensures proper alignment throughout the drilling operation, particularly valuable for applications where visualization of both sides of the workpiece simultaneously is difficult or impossible.

The invention is particularly advantageous for applications including marine piling modifications, utility pole hardware installation, timber framing, furniture making, and other scenarios involving substantial or irregularly shaped materials where traditional drill presses cannot be practically employed.

Additional objects, advantages and novel features of the invention will be set forth in part in the description that follows, and will become apparent to those skilled in the art upon examination of the following description, or may be learned by practice of the invention.

BRIEF DESCRIPTION OF THE DRAWINGS

Certain embodiments of the present invention are illustrated by the accompanying figures. It will be understood that certain figures are not necessarily to scale and that details not necessary for an understanding of the invention or that render other details difficult to perceive may be omitted.

It will be further understood that the invention is not necessarily limited to the particular embodiments illustrated herein.

Figure 1:
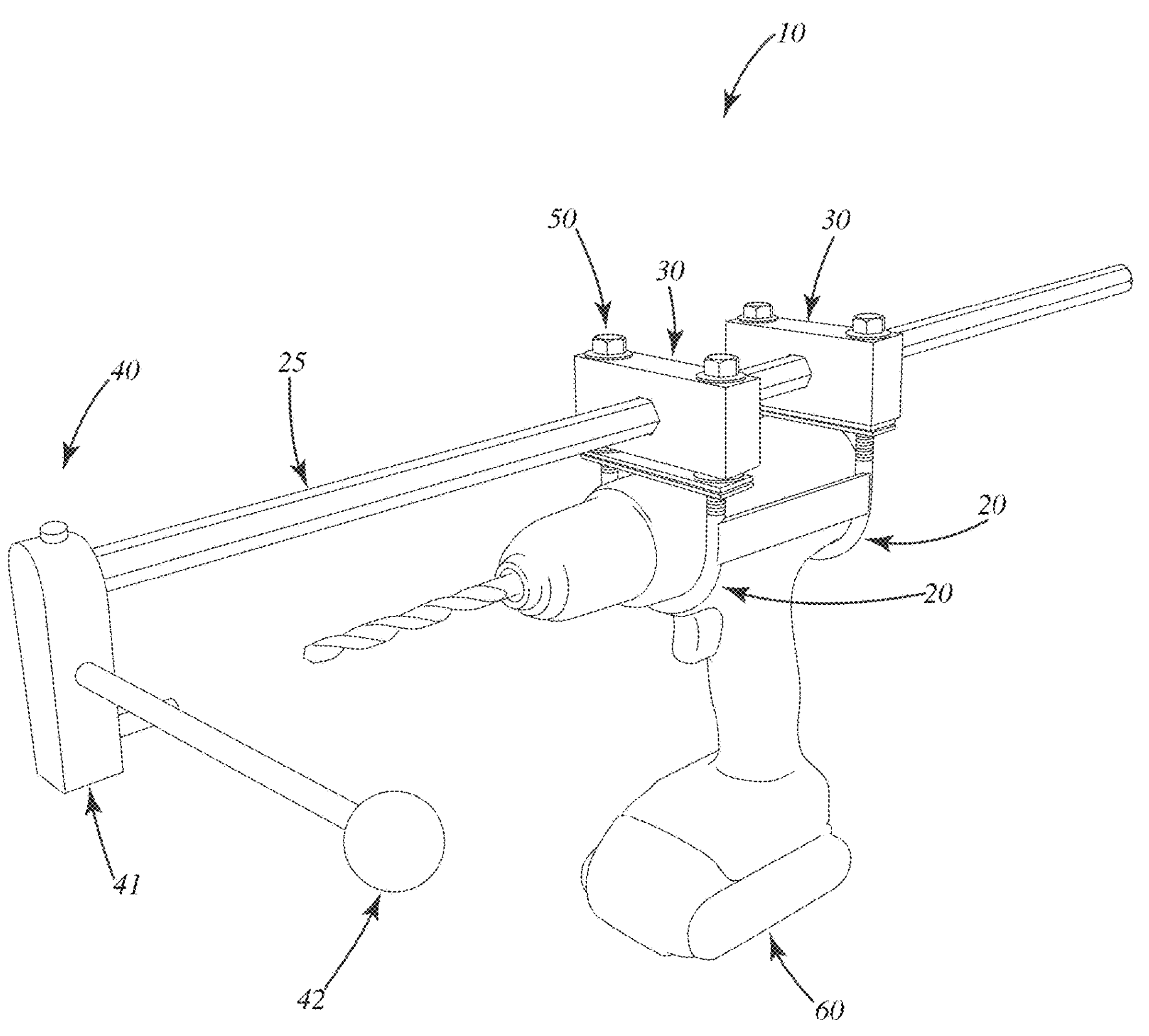
Figure 2:
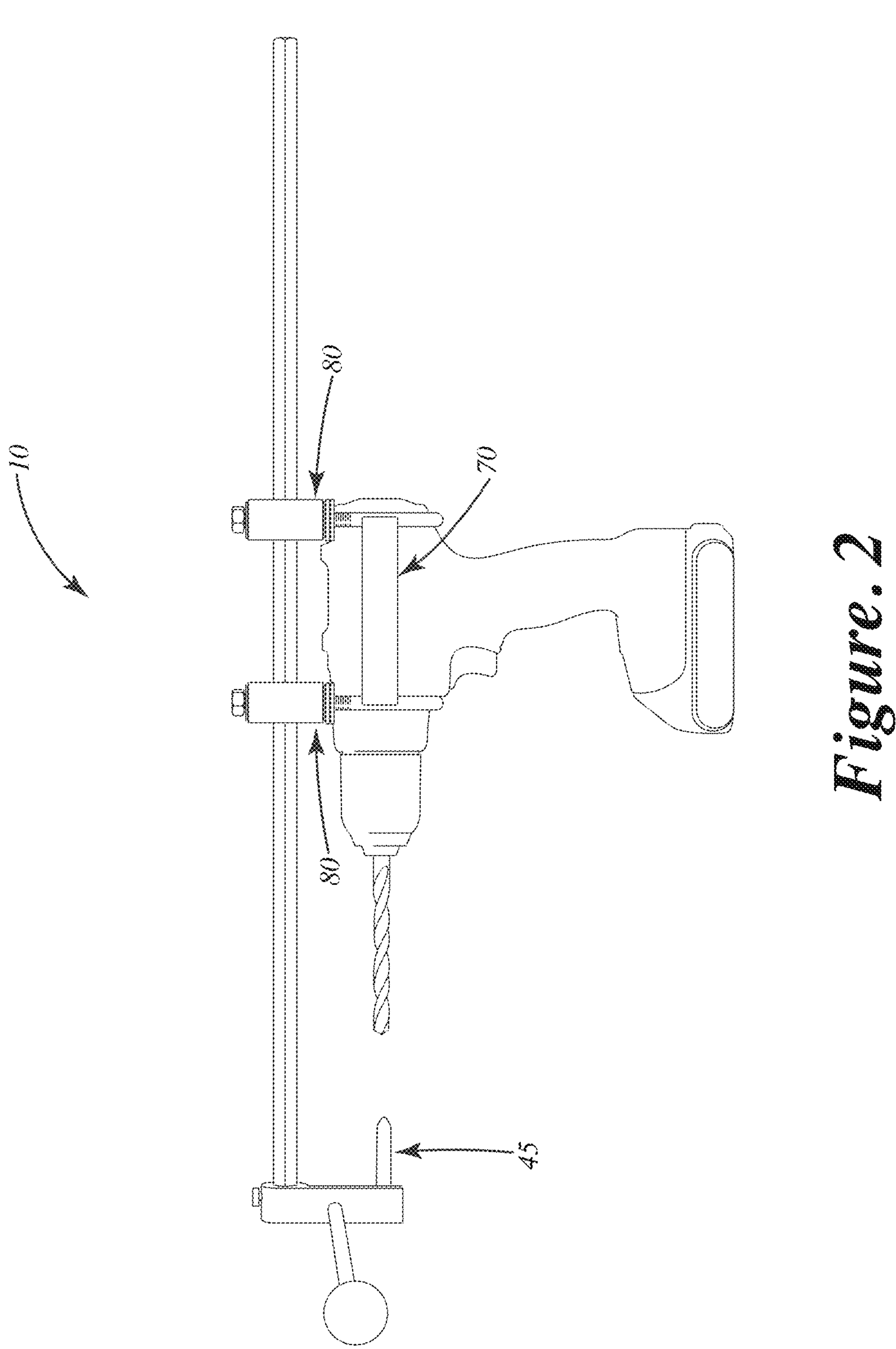
Figure 3:
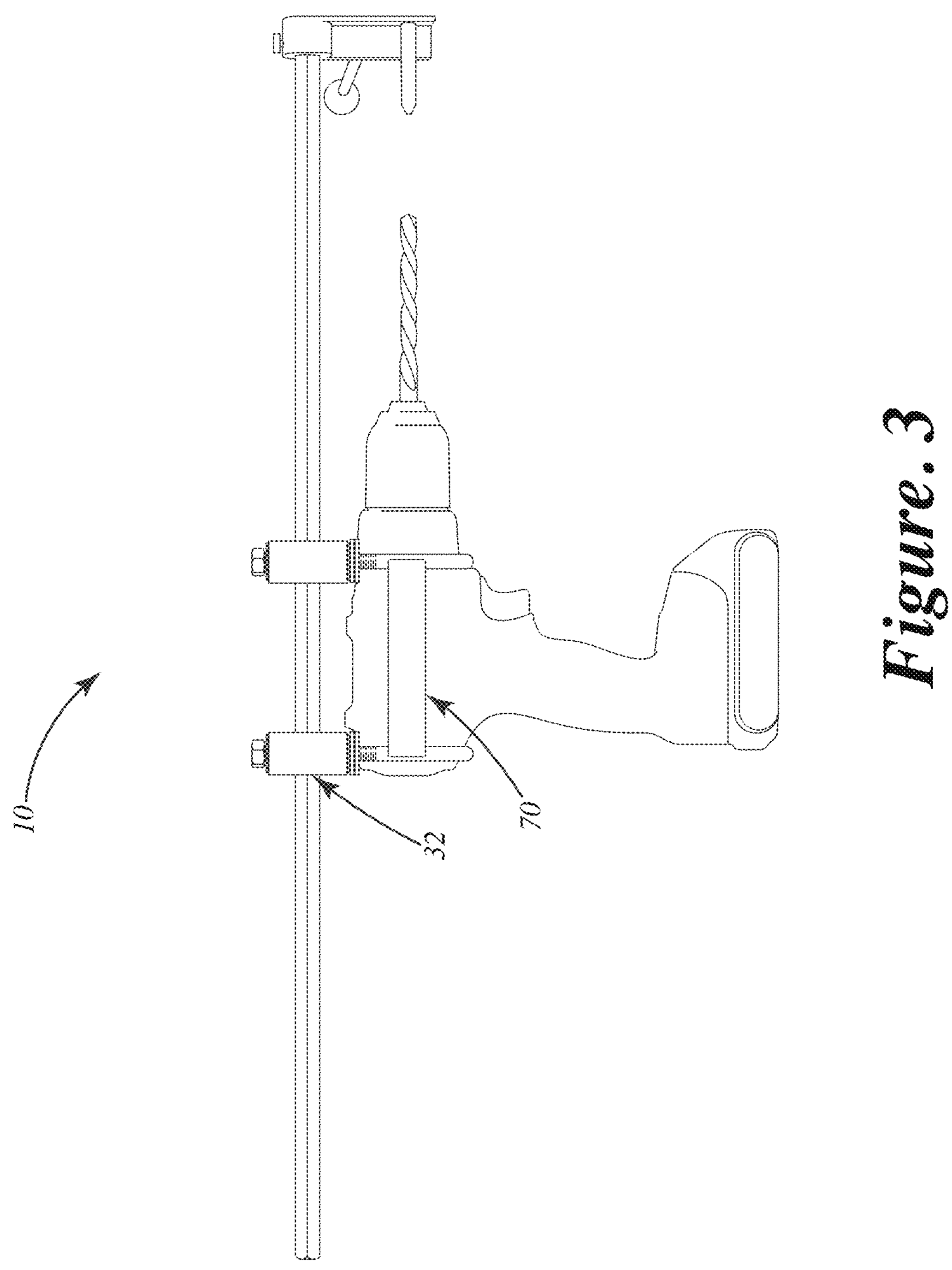
Figure 4:
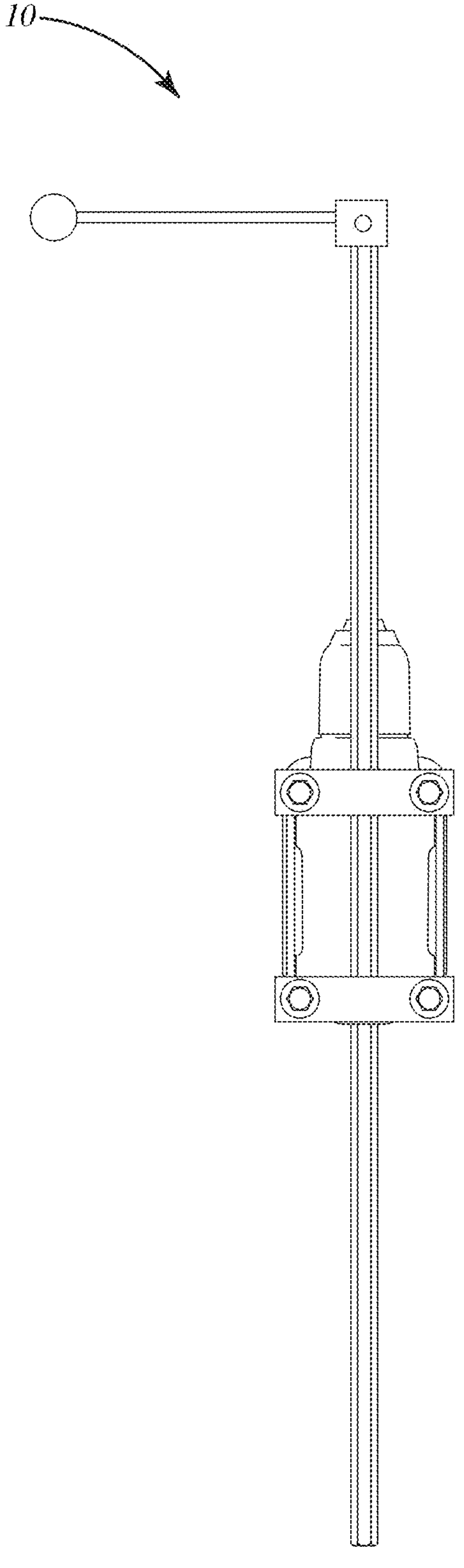
Figure 5:
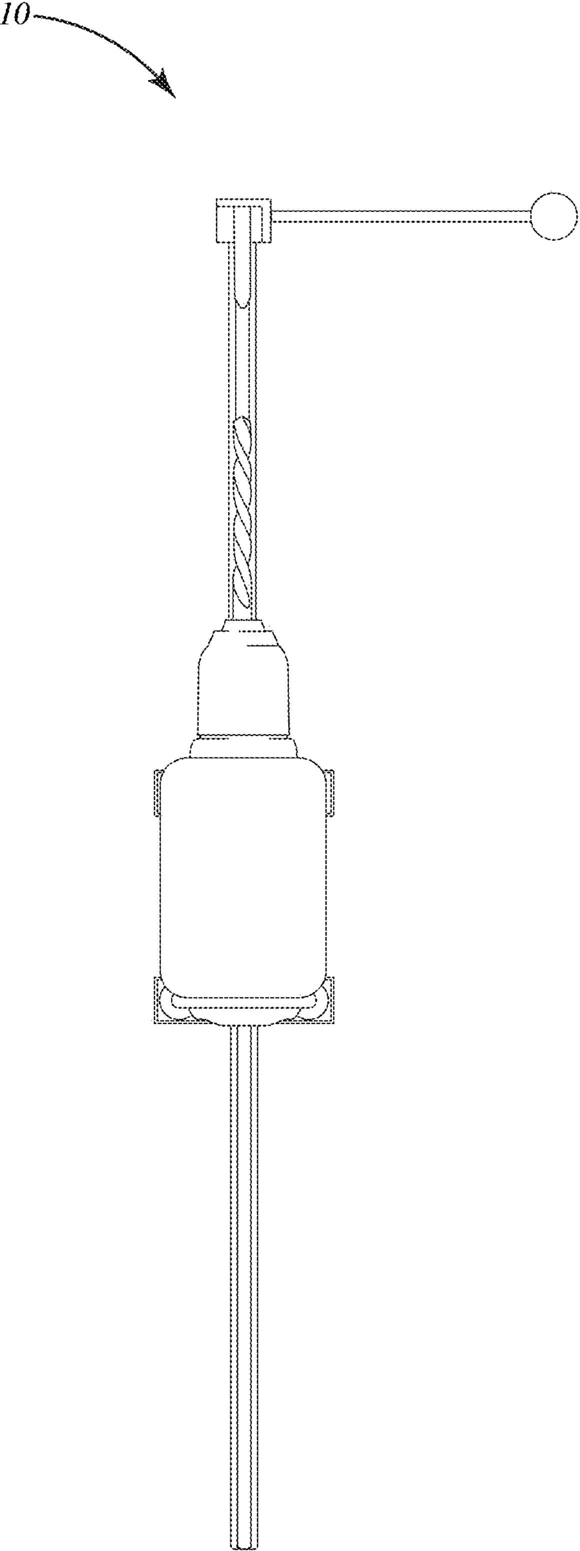
Figure 6:
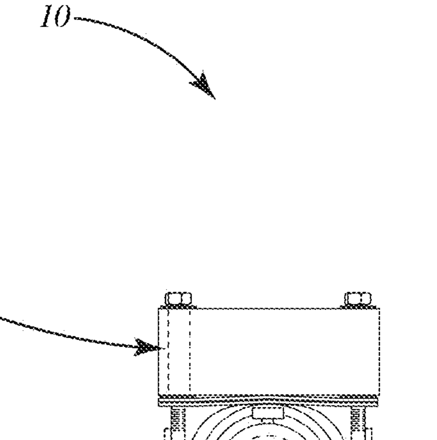
Figure 7:
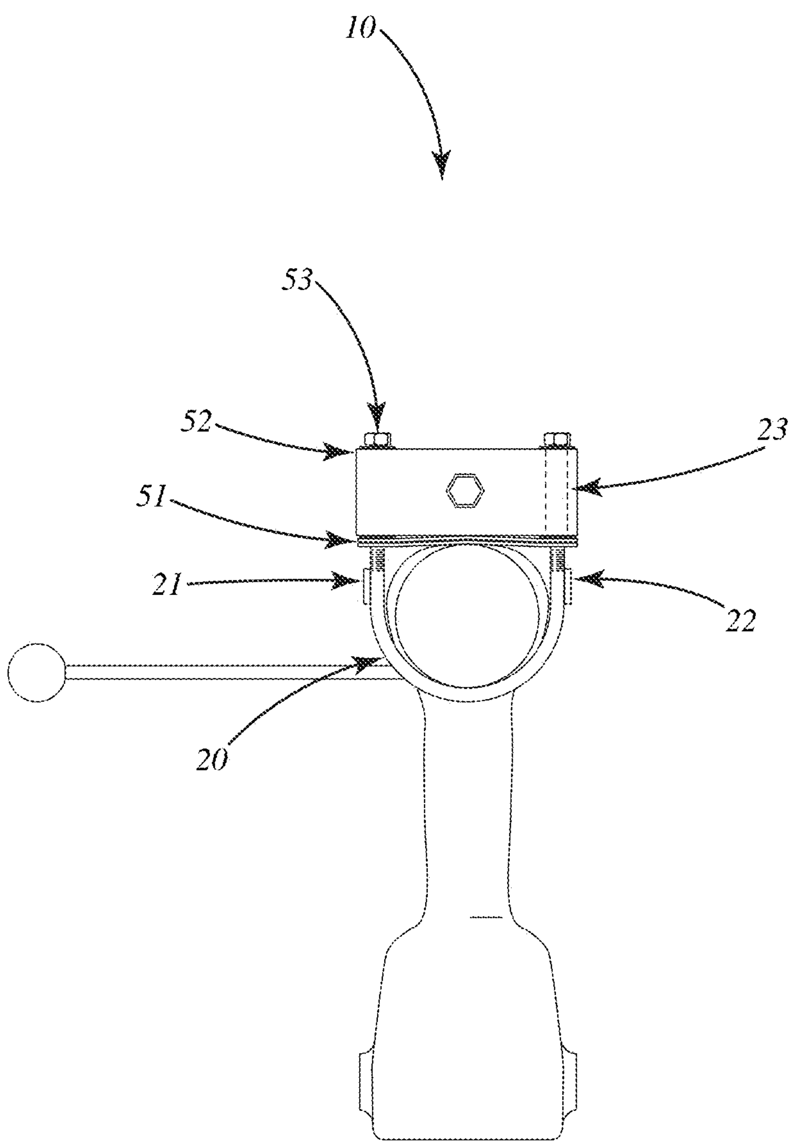
Figure 8:
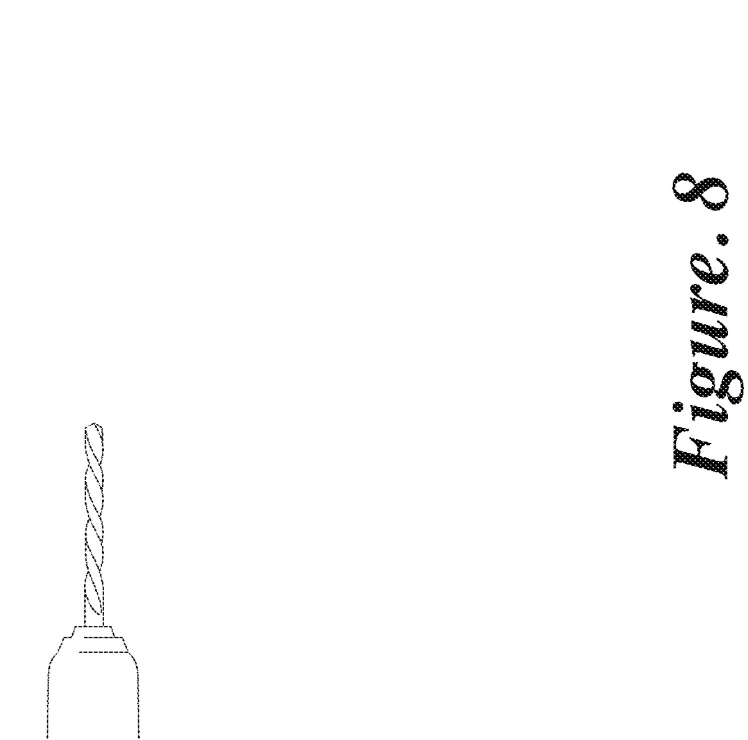
Figure 9:
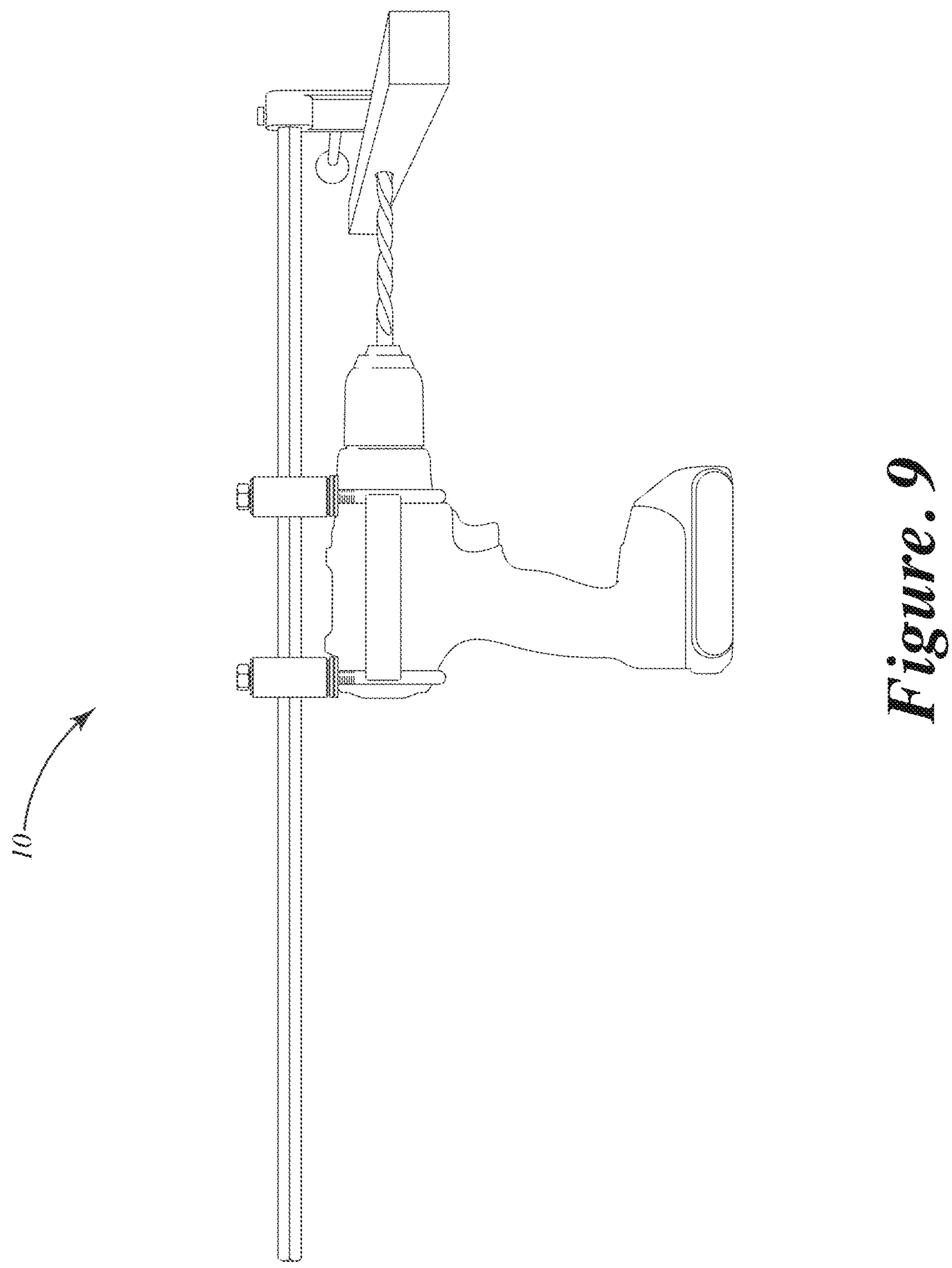

The invention will now be described with reference to the drawings wherein:

FIG. 1 shows a perspective view of the drill guide apparatus attached to a cordless drill, illustrating the major components;

FIG. 2 shows a left side elevation view of the drill guide apparatus of FIG. 1;

FIG. 3 shows a right side elevation view of the drill guide apparatus of FIG. 1;

FIG. 4 shows a top view of the drill guide apparatus of FIG. 1;

FIG. 5 shows a bottom view of the drill guide apparatus of FIG. 1;

FIG. 6 shows a front view of the drill guide apparatus of FIG. 1;

FIG. 7 shows a rear view of the drill guide apparatus of FIG. 1;

FIG. 8 shows a right side elevation view of the drill guide apparatus of FIG. 1 shown in an extended configuration; and FIG. 9 illustrates the complete assembly with all components in an operational configuration.

DETAILED DESCRIPTION OF THE INVENTION

Reference will now be made in detail to embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents that may be included within the spirit and scope of the invention.

Overview

The present invention provides a portable drill guide system that enables precise control of both entry and exit points when drilling through substantial workpieces. The invention is particularly valuable for applications involving cylindrical objects, irregular forms, or scenarios where visualization of both sides of the workpiece simultaneously is impractical.

Referring to FIGS. 1-9, the drill guide apparatus 10 comprises several primary components: U-shaped mounting brackets 20, mounting blocks 30, a clamping mechanism 40 with rod 25 and alignment pointer 45, and various attachment hardware components 50. The apparatus is designed to attach to a portable power drill 60, converting it into a precision boring tool with bidirectional alignment capabilities.

Detailed Component Description

U-Shaped Mounting Brackets

The U-shaped mounting brackets 20 include two parallel elongated members 21, 22 joined at one end, forming a U-shape. The members are preferably constructed from rigid, corrosion-resistant metal such as stainless steel, aluminum alloy, or zinc-plated steel to withstand demanding work environments.

The mounting brackets 20 include partially threaded sections 23 that enable secure attachment to other components and facilitate adjustability of the apparatus to accommodate workpieces of various dimensions. The threaded portions may employ standard thread patterns such as UNC, UNF, or metric threading to ensure compatibility with common fastening systems.

The parallel arrangement of the mounting brackets 20 establishes a precise drilling trajectory by creating a fixed spatial relationship between the drill chuck and the clamping mechanism, ensuring consistent alignment regardless of workpiece geometry.

The apparatus further includes a hexagonal cross-section rod 25 that slides through the mounting brackets 20. The hexagonal profile of rod 25 prevents rotational movement relative to the orientation of the drill while permitting linear adjustment along its axis. This feature ensures that the alignment established between the entry and exit points remains fixed throughout the operation, regardless of adjustments made to accommodate different workpiece dimensions.

Mounting Blocks

The mounting blocks 30 serve as the interface between the U-shaped mounting brackets 20 and the drill body 60. The blocks 30 are preferably constructed from high-density polyethylene, nylon, acetal copolymer, or similar engineering polymers that provide excellent dimensional stability and vibration dampening characteristics.

Each mounting block 30 includes precision-bored channels 31 through which the U-shaped mounting brackets 20 pass. The channels 31 are sized to provide a sliding fit with the mounting brackets, allowing for adjustability while maintaining proper alignment.

The mounting blocks 30 further include attachment points 32 for securing the apparatus to the drill body. These attachment points may utilize threaded fasteners, clamping mechanisms, or custom interfaces depending on the specific drill model the apparatus is designed to accommodate.

The polymer composition of the mounting blocks 30 serves multiple purposes: reducing weight, providing electrical insulation, minimizing marring of the drill body, and dampening operational vibrations that could affect drilling precision.

Clamping Mechanism and Alignment Pointer

The clamping mechanism 40 is positioned at the distal end of the U-shaped mounting brackets 20, opposite the drill attachment point. The mechanism comprises an L-bracket 41, a ball-ended clamping handle 42, and an exit hole alignment pointer 45.

The L-bracket 41 is indirectly and rigidly attached to the U-shaped mounting brackets 20 and provides the structural foundation for the clamping components. The L-configuration provides stability while allowing the clamping function to operate perpendicular to the drilling axis.

The L-bracket 41 is indirectly and rigidly attached to the U-shaped mounting brackets 20 and non-rotating rod 25, providing the structural foundation for the clamping components. The non-rotating rod 25 is securely fastened to L-bracket 41, ensuring that any alignment established at the exit point remains fixed relative to the drill's orientation. The L-configuration provides stability while allowing the clamping function to operate perpendicular to the drilling axis.

The secure attachment between rod 25 and L-bracket 41 may be accomplished through welding, mechanical fasteners, or other suitable joining methods that ensure rigid connection and prevent any relative movement between these components. This fixed connection is essential for maintaining precise alignment between the entry and exit points during drilling operations.

The ball-ended clamping handle 42 enables ergonomic operation of the clamping function, allowing users to apply appropriate pressure with minimal effort. The spherical end provides leverage while reducing the risk of injury during operation.

The exit hole alignment pointer 45, resembling a black nail or pin, extends from the L-bracket 41 and serves as the precise reference point for establishing the desired exit location before drilling commences. Its narrow profile enables accurate positioning even on irregular surfaces.

Mounting Hardware

The mounting hardware 50, depicted in various figures, includes spacers 51, washers 52, and nuts 53 that secure the components together. These elements are preferably constructed from corrosion-resistant materials compatible with the U-shaped mounting brackets 20.

The spacers 51 maintain proper separation between components and may be constructed from metal or polymer materials depending on the specific application requirements.

The washers 52 distribute clamping forces and prevent damage to mating surfaces during assembly and operation. They may include standard flat washers, lock washers, or specialized designs as required.

The nuts 53 engage with the threaded portions of the U-shaped mounting brackets 20 and enable secure fastening of the assembly. They may include hex nuts, wing nuts, or knurled nuts depending on the intended operational environment and user ergonomic considerations.

Workpiece Contact Components

As shown collectively in FIGS. 1-9, the components that directly interface with the workpiece include:

The two U-shaped mounting brackets 20, which establish the primary structural framework and trajectory control.

Rectangular side brackets 70, which provide lateral stability during operation and help distribute clamping forces across a larger surface area of the workpiece.

Front and rear top brackets 80, which complete the workpiece engagement system and ensure the apparatus maintains proper orientation throughout the drilling operation.

These contact components are strategically positioned to maximize stability while minimizing interference with the drilling operation. Their configuration accommodates various workpiece geometries, including flat, cylindrical, and irregular surfaces.

Method of Operation

The present invention enables a novel method for creating precisely aligned through-holes, particularly valuable for applications where visualization of both sides of the workpiece simultaneously is difficult or impossible. The method comprises the following steps:

Step 1: Exit Point Establishment

The operator first positions the drill guide apparatus at the desired exit location, using the alignment pointer 45 to precisely mark where the drill bit should emerge. This reverses the conventional approach of focusing primarily on the entry point.

The alignment pointer 45 serves as the reference point, allowing the operator to consider factors such as clearance requirements, structural considerations, and subsequent assembly operations when determining the optimal exit location.

Step 2: Apparatus Securing

Once the exit point is established, the operator secures the clamping mechanism 40 to the workpiece, using the ball-ended handle 42 to apply appropriate pressure. It will be understood that the apparatus can be pre-secured and/or assembled.

The rectangular side brackets 70 and top brackets 80 engage with the drill surface, distributing the clamping force and ensuring the apparatus remains stable during subsequent operations.

The U-shaped mounting brackets 20 establish the drilling trajectory, creating a fixed spatial relationship between the exit point and the yet-to-be-determined entry point.

Step 3: Drill Positioning and Entry Point Determination

With the apparatus secured to the workpiece and the exit point established, the operator attaches the power drill 60 to the mounting blocks 30.

The position of the drill bit tip relative to the workpiece surface automatically determines the entry point location, ensuring perfect alignment with the predetermined exit point.

This approach eliminates the guesswork traditionally associated with through-hole drilling, particularly for substantial or irregularly shaped workpieces.

Step 4: Drilling Operation

With both entry and exit points established through the physical reference system created by the apparatus, the operator proceeds with the drilling operation.

The U-shaped mounting brackets 20 guide the drill along the established trajectory, maintaining alignment throughout the operation regardless of workpiece thickness or geometry.

The polymer mounting blocks 30 dampen vibrations during operation, enhancing precision and reducing operator fatigue.

Step 5: Completion and Verification

Upon completion of the drilling operation, the apparatus can be removed, revealing a precisely aligned through-hole with entry and exit points positioned exactly as intended.

The method enables verification of alignment before drilling commences, reducing material waste and rework associated with misaligned holes.

Applications

The invention finds particular utility in applications including but not limited to:

Marine construction, where pilings and structural members frequently require precisely aligned through-holes for hardware installation, cable routing, or attachment of auxiliary components.

Utility pole modifications, where accurately positioned holes are essential for proper hardware installation and compliance with safety standards.

Timber framing, particularly for large-dimension lumber where conventional drill presses cannot accommodate the material dimensions.

Furniture making, especially for cylindrical components such as table legs, bedposts, or chair spindles.

General construction applications involving substantial materials where portable operation is essential.

VARIATIONS AND ALTERNATIVE EMBODIMENTS

While the disclosed embodiment utilizes U-shaped mounting brackets, alternative implementations could employ telescoping rods, adjustable-angle mechanisms, or modular components to accommodate different drilling scenarios.

The mounting blocks could incorporate quick-release mechanisms to facilitate rapid attachment and detachment from the power drill, enhancing operational efficiency in production environments.

The clamping mechanism could be adapted to include laser alignment capabilities, digital measurement displays, or template-based positioning systems for specialized applications.

Scale markings could be incorporated onto the U-shaped mounting brackets to facilitate precise depth control or spacing of multiple holes.

Adapters could be developed to enable compatibility with a wider range of power drill models, including corded drills, right-angle drills, or specialized boring equipment.

In a further embodiment, the alignment pointer 45 may include adjustable length capabilities to accommodate different drilling depths and workpiece thicknesses. This adjustable feature may comprise a telescoping mechanism, threaded extension system, or interchangeable pointer tips of varying lengths, allowing operators to optimize the reference point positioning based on specific application requirements.

The non-rotating rod 25 may additionally incorporate scale markings or measurement indicators along its length, enabling precise positioning of the drill relative to the exit point. These markings facilitate accurate depth control and can assist in positioning multiple holes at specific intervals, particularly valuable in applications requiring precise spacing such as bolt patterns for marine hardware installation.

In another embodiment, the mounting blocks 30 may incorporate rotation-limiting features that interact with corresponding features on the drill body 60, ensuring that the drill maintains proper rotational alignment throughout operation. These features may include keyed interfaces, indexing detents, or interlocking geometries that prevent unintended rotation while still allowing necessary adjustments.

The L-bracket 41 may further include reinforcement ribs or gussets at stress concentration points to enhance structural stability during clamping operations on particularly dense or hard materials. These reinforcements distribute clamping forces more effectively and minimize deflection that could compromise alignment precision.

The ball-ended clamping handle 42 may incorporate a ratcheting mechanism to maintain clamping pressure without continuous operator effort, particularly advantageous in applications requiring extended drilling operations or when working in confined spaces where maintaining manual pressure would be difficult.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A portable drill guide apparatus, comprising:

a pair of U-shaped mounting brackets, each U-shaped mounting bracket having two parallel elongated members joined at one end, said elongated members having partially threaded portions;

mounting blocks, each mounting block defining channels through which said parallel elongated members of said U-shaped mounting brackets pass, said mounting blocks attached to a portable power drill;

a rod having a hexagonal cross-section, said rod slidably received through hexagonal apertures in said mounting blocks;

an L-bracket indirectly and rigidly attached to said U-shaped mounting brackets and to said rod;

a ball-ended clamping handle attached to said L-bracket; and an alignment pointer extending from said L-bracket.

2. A portable drill guide apparatus, comprising:

a pair of U-shaped mounting brackets constructed from metal, each U-shaped mounting bracket having two parallel elongated members joined at a curved proximal end, said elongated members having partially threaded distal portions;

a pair of mounting blocks constructed from polymer material, each mounting block attached to a housing of a portable power drill, each mounting block defining channels through which said parallel elongated members of a respective one of said U-shaped mounting brackets pass;

a rod having a hexagonal cross-section, said rod slidably received through hexagonal apertures in said mounting blocks;

an L-bracket indirectly and rigidly attached to said U-shaped mounting brackets, said rod rigidly secured to said L-bracket;

a ball-ended clamping handle attached to said L-bracket;

an alignment pointer comprising a pin extending from said L-bracket;

rectangular side brackets attached to said U-shaped mounting brackets; and top brackets attached to said U-shaped mounting brackets.

3. A portable drill guide apparatus, consisting of:

a portable power drill;

exactly two U-shaped mounting brackets constructed from metal, each having two parallel elongated members joined at a curved proximal end, each elongated member having a partially threaded distal portion;

exactly two mounting blocks constructed from polymer material, each attached to said portable power drill, each defining channels receiving said parallel elongated members of a respective one of said U-shaped mounting brackets;

a rod having a hexagonal cross-section, said rod slidably received through hexagonal apertures in said mounting blocks;

an L-bracket indirectly and rigidly attached to said U-shaped mounting brackets, said rod rigidly secured to said L-bracket;

a ball-ended clamping handle attached to said L-bracket;

an alignment pointer comprising a pin extending from said L-bracket;

spacers positioned on said elongated members;

washers positioned on said elongated members adjacent said spacers;

nuts engaged with said partially threaded distal portions of said elongated members;

two rectangular side brackets attached to said U-shaped mounting brackets; and two top brackets attached to said U-shaped mounting brackets.

* * * * *